(12) United States Patent
Roskowski

(10) Patent No.: US 6,212,554 B1
(45) Date of Patent: *Apr. 3, 2001

(54) ADVERTISING BANNERS FOR DESTINATION WEB SITES

(75) Inventor: Steven G. Roskowski, San Jose, CA (US)

(73) Assignee: HearMe, Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,958

(22) Filed: Dec. 16, 1997

(51) Int. Cl.[7] ............................................. G06F 15/16

(52) U.S. Cl. ........................ 709/217; 709/219; 709/203

(58) Field of Search ................................. 709/217, 218, 709/224, 203, 219, 227; 705/14, 10

(56) References Cited

U.S. PATENT DOCUMENTS

| | | | | |
|---|---|---|---|---|
| 5,572,643 | * | 11/1996 | Judson | 709/218 |
| 5,796,952 | * | 8/1998 | Davis et al. | 709/224 |
| 5,809,242 | * | 9/1998 | Shaw et al. | 709/217 |
| 5,848,396 | * | 12/1998 | Gerace | 705/10 |
| 5,848,397 | * | 12/1998 | Marsh et al. | 705/14 |
| 5,860,068 | * | 1/1999 | Cook | 709/217 |
| 5,918,239 | * | 6/1999 | Allen et al. | 707/526 |
| 5,978,381 | * | 11/1999 | Perlman et al. | 709/219 |

* cited by examiner

Primary Examiner—Zarni Maung
Assistant Examiner—Philip B. Tran
(74) Attorney, Agent, or Firm—Wagner, Murabito & Hao LLP

(57) ABSTRACT

A method and server to make advertisement banners, at destination sites in a client-server computer network supporting a uniform hypertextual protocol, more attractive for client-users to explore are provided. Upon receiving a request for information related to an advertisement banner at a destination site, the server delays sending the requested information at least until the client user completes the task that he logs on to the destination to perform.

22 Claims, 6 Drawing Sheets

ADVERTISING BANNERS FOR DESTINATION WEB SITES

BACKGROUND OF THE INVENTION

1. Field of the Invention

The invention generally relates to client-server network environments such as those commonly implemented using the Internet, and more particularly relates to Internet borne advertisements.

2. Description of the Related Art

Information that used to take weeks to search and retrieve is now at our fingertips. The proliferation of servers in on-line networks including the Internet, and in particular the World Wide Web (hereinafter the Web), makes a large amount of information accessible to almost anyone connected to the Internet.

A common layout language for a Web document is Hypertext Markup Language (HTML). Each Web document is given a "Uniform Resource Locator" (URL) which is essentially an address path identifying the server which hosts the desired document plus the location of the document on the server. Using browser software such as NETSCAPE NAVIGATOR (TM), an end-user can send a request from a client computer to access a document stored at a particular server referenced in a URL. When the server receives the user's request, it sends an electronic copy of the requested HTML Web document to the client where an image of the document can be displayed. One of the communications protocols used in making such a request and in transferring Web documents is "Hypertext Transfer Protocol" (HTTP). Servers that maintain HTML Web documents are referred to as Web sites. For more information about the Web, see for example T. Berners-Lee, R. Cailliau, A. Loutonen, H. F. Nielsen, and A. Secret, "The World Wide Web," Communications of the ACM, vol. 37(8), August 1994.

HTML allows any Web document to include hypertextual references (known as "links") to other Web documents including documents that are graphical images. The effect of a hypertextual link, as is well known by practitioners of the art, is that when the document containing the link is displayed to an end-user at a client computer, the end-user can access the linked document by pointing at, and selecting a corresponding icon or highlighted text in the displayed document; a graphics image that has already been created and stored in a graphic file is retrieved and sent over the Web to the requesting end-user's computer for display. Such pointing and selecting may be accomplished with a pointing device such as a computer mouse, joystick or track-ball, as is well known in the art. In some cases a link is followed automatically and without intervention on the part of the user, in other cases a link is followed only as a result of a user pointing at and optionally selecting a video image that represents the link.

Given the amount of information available via the Internet as well as the speed and costs of using the Internet, it is not surprising that the Internet is widely used as a research tool as well as for general business purposes such as advertising and commercial transactions. Another use of the Internet that is currently gaining popularity is in conjunction with the playing of digital electronic games (sometimes termed video games).

In using the Internet for digital electronic game playing, two or more players in mutually distant geographical locations, and using computers equipped for digital electronic game playing, can share in a single game. Generally, commercial game systems use server computers that are connected to the Internet by permanent data communications links that have high bandwidth and low latency. The server computers act as a liaison between the players both before and during game play.

Client home computers are typically connected to the Internet by temporary data communications links (e.g., using the ordinary telephone system). Each game service normally has a Web site that client home computers log onto in order to select the type of digital electronic game as well as to supply information required to allow the server computers to properly match players with similar skill levels, communications bandwidth, communications latency, etc. for game playing.

Due to the functions that it serves, such a Web site is known as a destination site. Thus a destination site may be a Web site that client-users log onto for the purpose of engaging in a compelling real-time event such as an electronic video game session. For economic reasons, and like many other Web sites, destination sites also have built-in hypertextual advertising banners to promote products, services, etc. The game player may use a pointing device such as a computer mouse to select a hypertextual advertising banner, the player's client home computer then establishes a HTTP connection with a designated Web site that furnishes the client home computer with additional information on the advertised product or service. In this manner the client home computer becomes disconnected from the destination site and the client-user's current task and/or context (e.g., a game session) becomes disrupted.

Such interruption is not desirable because in logging onto to a destination site such as a game system server, a client-user normally wishes to remain connected for an extended period to that destination site, at least until the current task is completed. As a result, the client-user may be hesitant to select an advertising hypertextual link even though interested in the particular product or service. When client-users avoid selecting advertising hypertextual links at destination Web sites, promotional benefits and opportunities are lost by advertisers who are paying valuable consideration to the service provider for the presentation, to the client-users, of advertising likes. This loss of financial benefit indirectly but significantly impacts the service provider.

Thus a need exists for a method and/or apparatus to make the exploration of advertising banners at destination Web sites more attractive to client-users.

SUMMARY OF THE INVENTION

Accordingly, the present invention provides a method and apparatus to make the advertising links at destination Web sites more attractive for client-users to explore.

Destination Web sites such as the highly successful MPLAYER (TM) on-line gaming service use paid advertising as a means of generating significant revenues for the service operator. The advertising industry has been quick to make use of this relatively novel medium. Already several paradigms have emerged, in particular there are standardized advertisement formats and metrics for advertisement inventory utilization, revenue, and performance. An important measure of performance that has quickly arisen is the so-called "click through rate" which reflects the rate at which users follow the hot links imbedded in advertisement images to get more information about an advertised offering. The present invention seeks to evolve the existing modes whilst synergistically improving advertising value to purveyor and consumer alike, and, consequentially but materially, increasing revenue for the service provider. Fortuitously there is little resistance to change in Web based advertising techniques, due in large measure to the relative novelty of the medium and to its persisting evolution to accommodate newer features such as sound bites and animation of various kinds.

In one embodiment of the invention, there is provision for deferred presentation of advertising material. This can take any of a number of forms. For example the advertisement may be presented later, after a minimum measured time interval and/or the occurrence of a recognized event such as the completion of a game (in a game service context). Alternatively advertisements may be sent by email or via enrollment in so-called "push channels". Push channels are relatively new but already well known amongst Web site implementors.

In another embodiment of the invention there is provision for the evaluation and recording of interest in offerings so as to correlate and subsequently target advertising to those users for whom it has likely relevance. Analogous techniques are well known in the advertising industry where, for example, advertising for toys may be effectively targeted at consumers who had several years earlier expressed an interest in baby food. Thus use of the invention can refine the quality and value of the demographic information in the service provider's database of customers, and at a less macroscopic level, be used to generate sales leads.

In a further embodiment of the invention, there is provision for the creation of pages of information personalized to reflect the interests and tastes of the user as expressed through use of the pointing device in connection with advertisements. Advertisements used in this manner may be overt or covert such as though a choice of options within a game. In a particular embodiment the pages of personalized information may be a collection of the advertising banner previously elected. Such personalized pages may be stored locally at the client-computer or in a centralized server or elsewhere, or (usually) distributed in some combination of such locations. Facilities may be present to enable the user to reorganize the personalized pages, such as removing components by registering disinterest in something that was previously interesting or as part of a conscious decision aimed at concealment.

Thus, a user of a client computer that is subscribed to an on-line service and that is imaging an associated destination Web site, is presented with an image (and perhaps sound) that constitutes an advertisement, and, selecting the corresponding image with a pointing device and thereby expressing interest in the advertised offering, several things may occur in succession or disjointedly:

1) A message documenting the interest is transmitted by the client computer, via a communications network, to a Web site server computer.

2) Using its databases, the server computer correlates the message with the offering and the personal information recorded about the user.

3) The personal information maintained about the user in the databases is updated to reflect the expressed interest in the offering.

4) Using timers and task completion criteria arrangements are made for promotional materials regarding the advertised offering to be transmitted to the client computer at a later time.

5) At a later date targeted promotional material is selected to be sent to users for whom correlated interests have been recorded in the databases.

6) Sales lead information about the users is transmitted to vendors.

7) Statistical information is compiled for various purposes, including generating figures of merit in regards to the consumer oriented demographics of the user population to facilitate the selling of advertising distributions via the on-line service.

All the features and advantages of the present invention will become apparent from the following detailed description of its preferred embodiment whose description should be taken in conjunction with the accompanying drawings.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. It is to be appreciated that although the description relates to digital electronic games, the invention is applicable to other types of computer application programs such as word processors, simulations, electronic data processing (EDP), and others.

Figure 1:
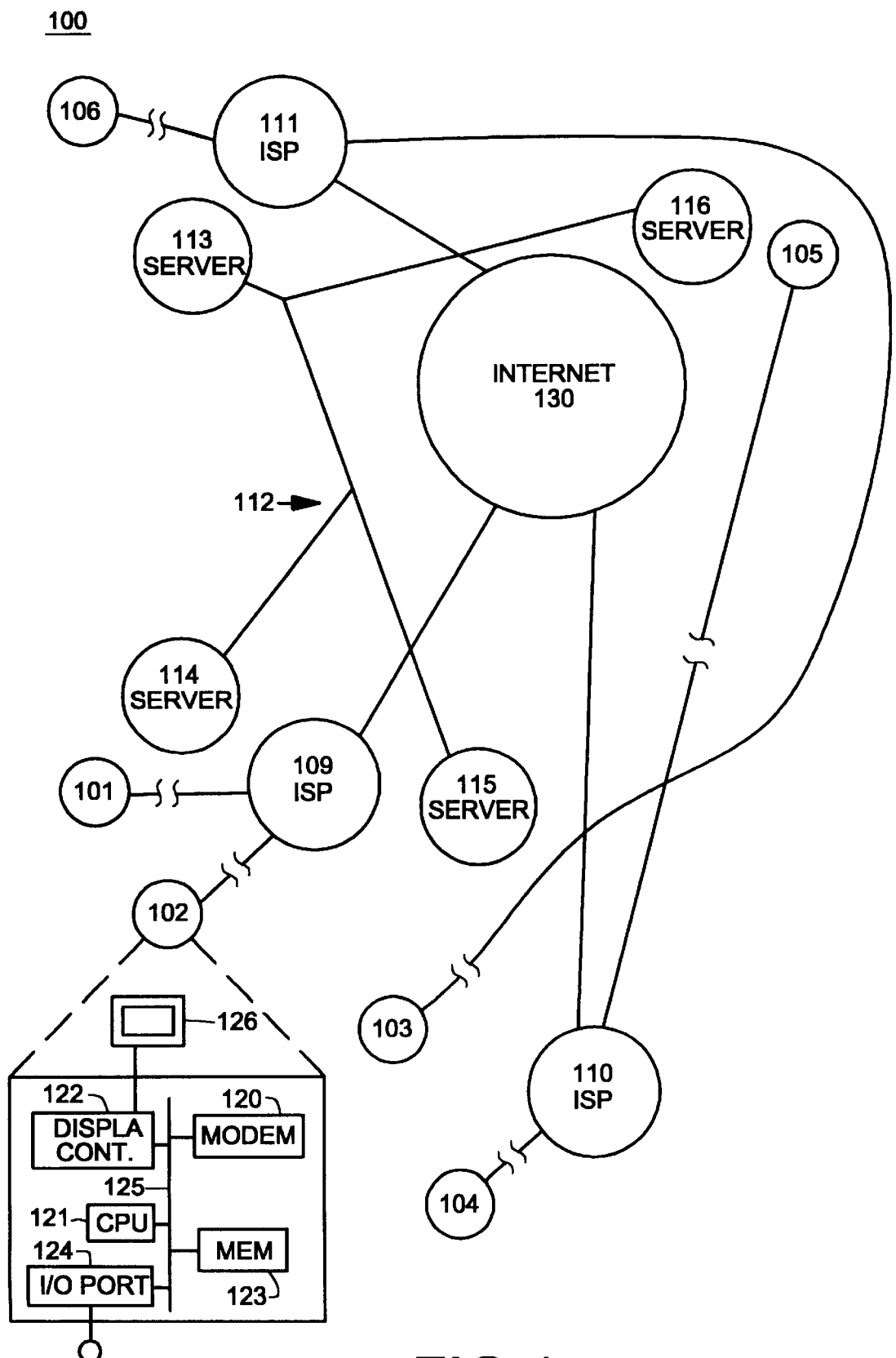
FIG. 1 is a high level diagram illustrating a typical data communications network implementing the present invention.

Reference is made to FIG. 1 illustrating a high level diagram of a typical data communications inter-network 100 implementing an embodiment of the present invention. As shown in FIG. 1, the data communications network includes a number of client player computers 101–106 each having a modulator-demodulator (Modem) 120 (shown only for computer 102 for reasons of clarity) to use in connecting client computers 101–106 to the Public Switched Telephone Network (PSTN, not shown) which connect client computers 101–106 to remote routers 109–111 which are installed by their respective Internet Service Providers (ISPs). Each of client player computer 101–106 typically includes a micro processing unit (MPU) 121, a display controller 122, memory 123, at least one serial port 124, and a modulator-demodulator (Modem) 120, which are connected to each other by a system bus 125. The memory 123 stores browser software (e.g., NETSCAPE NAVIGATOR (TM), MICROSOFT EXPLORER (TM), etc.) to communicate with server computers. The display controller 122 generates video signals representing application or game environment to display on a video display 126. Each client player computer 101–106 may be further connected to local input control devices such as keyboard, joysticks, track balls (not shown) at its input/output port(s).

It is to be appreciated that computers 101–106 can be connected to remote routers 109–111 via other types of networks such as the Integrated Services Digital Network (ISDN). Any of computers 101–106 could alternatively be connected to routers 109–111 on a permanent circuit basis using data communications hardware such as a T1 connection (a type of unswitched synchronous connection).

Remote routers 109–111 connect the client computers 101–106 to client-server network 112 via some communication hardware such as routers, broadband synchronous digital telecommunications circuits, etc. (not shown). In the preferred embodiment, the client-server network 112 is implemented using the Internet 130. Application (game) servers 113–116 are connected to client-server network 112 which may be implemented using high performance unswitched circuits.

In the preferred embodiment the server network 112 is implemented on top of the Internet, each server has a low latency connection to an Internet backbone circuit. In the case where the server network 112 is not implemented on top of the Internet, then at least one high performance connection (not shown) between server network 112 and an inter-network (which could be but need not be the Internet) is required so that player computers 101 to 106 may communicate with the network 112 and servers 113–116.

Application (game) servers 113–116 are typically installed by an on-line digital electronic game service provider to perform the necessary tasks of coordinating on-line games for client computers 101–106. As such, application (game) servers 113–116 implement an interactive destination Web site for the on-line digital electronic game service. Preferably, at least one application (game) server is placed in close Internet proximity to each major population center. It is to be appreciated that servers 113–116 can also be used in providing other types of computer application services such as word processors, simulations, electronic data processing (EDP), and others.

Figure 2:
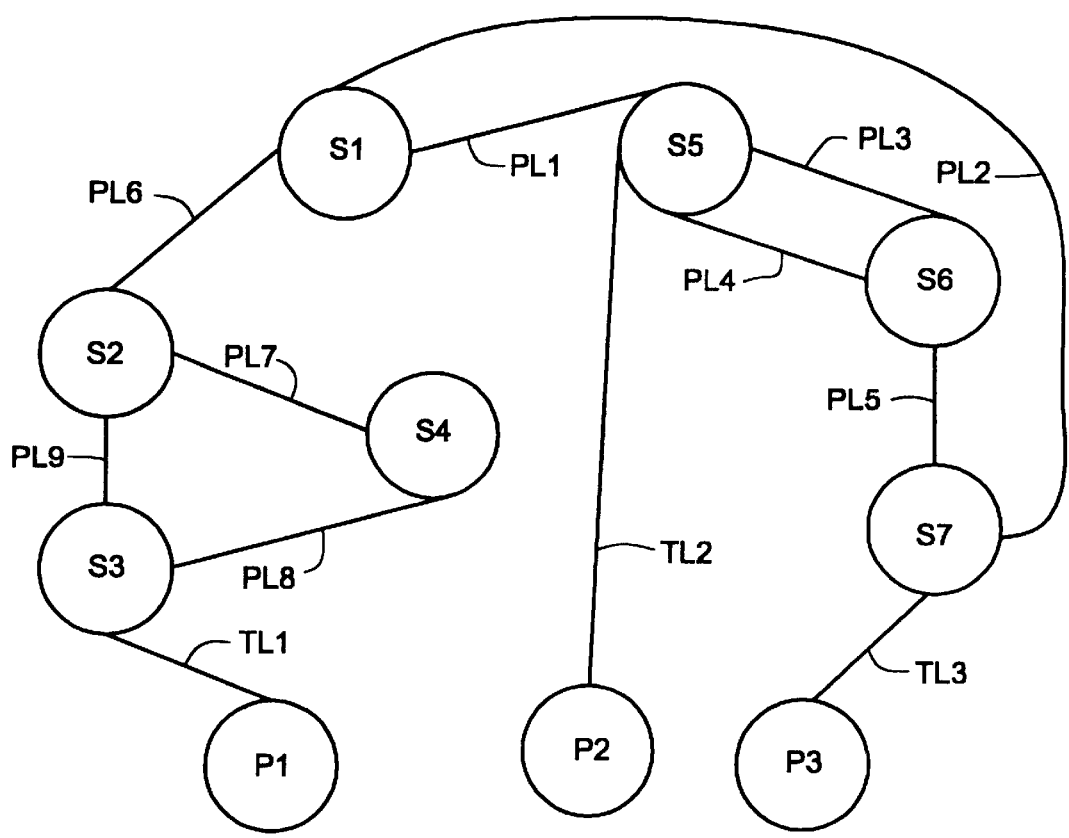
FIG. 2 illustrates a simplified connection diagram between some client computers and some servers according to the communications network arrangement described of FIG. 1.

Referring now to FIG. 2 illustrating, as an example, a connection diagram between some client computers (paradigmatically player computers) and some game servers in conformance with the communications network arrangement described in FIG. 1 above. However, for the sake of simplicity and clarity, details related to the connections between the client computers and the Internet as well as details related to the connections between the game servers and the Internet are omitted. As such, only the connections between the clients and the servers and between the servers themselves are shown. As can be seen in FIG. 2, servers S1–S7 and clients P1–P3 are connected to each in a relatively unstructured topology. As discussed earlier, while the connections/links between servers are permanent, the connections between clients and servers are (in the preferred embodiment) transitory. Accordingly, the permanent links between the servers S1–S7 are PL1–PL9 and the transitory links between clients P1–P3 and servers S1–57 are TL1–TL3. FIG. 2 also demonstrates that due to the nature of the Internet, while the players may be located close to each other geographically, they may be located far apart in terms of Internet connections. This is so because while the players may be close to each other geographically, the players may be connected to different servers that are only indirectly connected to each other. Hence, to communicate to each other, the players have to communicate through inter-network gateways (not shown).

Figure 3:
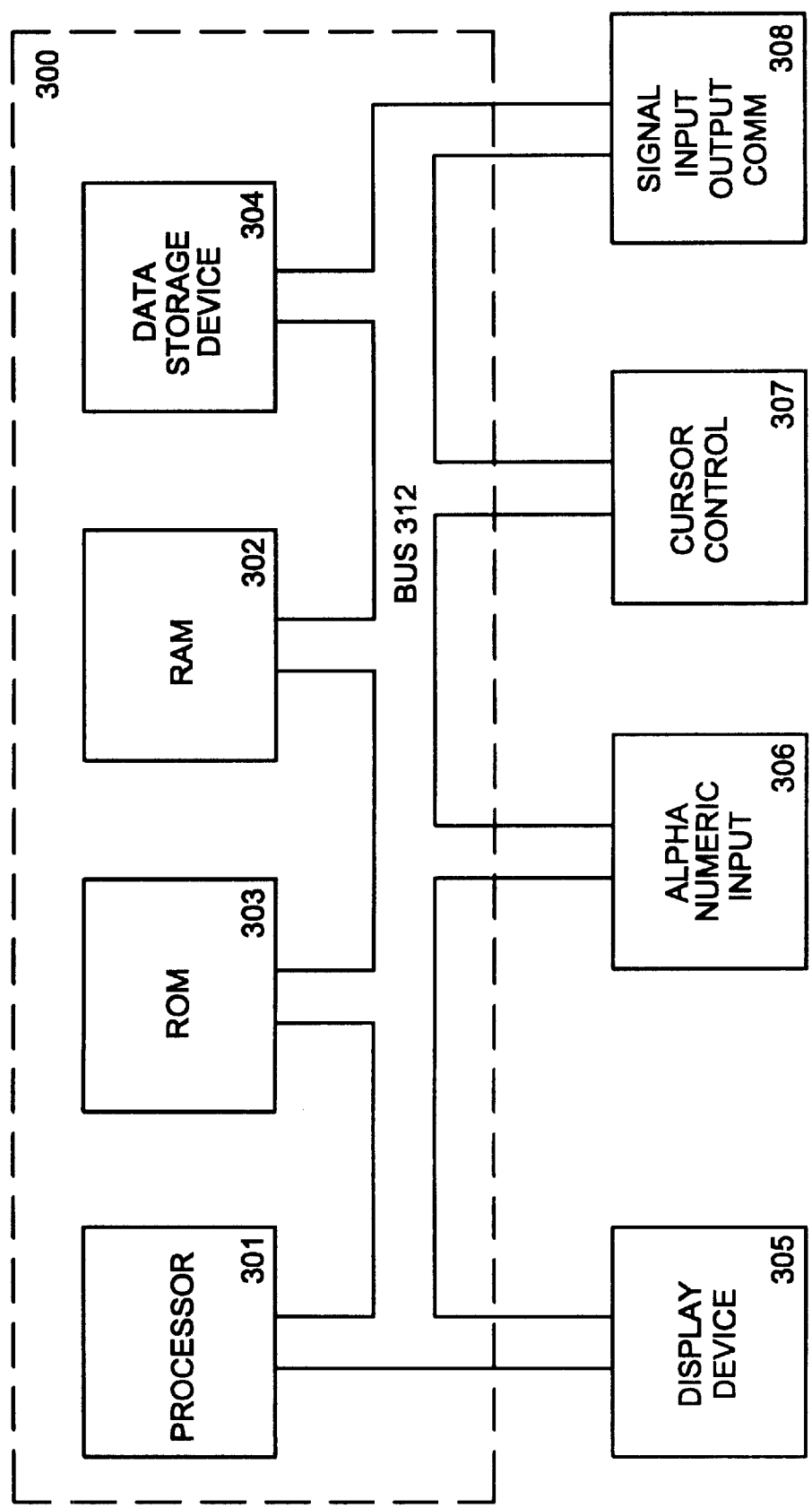
FIG. 3 illustrates a typical server computer connected to the data communications network of FIG. 1 in accordance to the present invention.

Reference is made to FIG. 3 illustrating a block diagram of a typical server computer system 300 upon which the present invention may be implemented or practiced. Server computer system 300 is connected to the Internet in the fashion described in the discussion related to FIGS. 1–2 (supra). It is to be appreciated that server computer system 300 is exemplary only and that the present invention can operate within a number of different computer systems including general purpose computers systems, embedded computer systems, and others. In the following discussions of the present invention, certain processes and steps that are realized as a series of instructions (e.g., software program) that reside within computer readable memory units of system 300 and executed by processors of system 300.

In general, server computer system 300 used by the present invention comprises address/data bus 312 for conveying information and instructions, central processor (CPU) 301 coupled with bus 312 for processing information and instructions, a random access memory (RAM) 302 for storing digital information and instructions, a read only memory (ROM) 303 for storing information and instructions of a more permanent nature. In addition, server computer system 300 may also include a data storage device 304 (e.g., a magnetic, optical, floppy, or tape drive) for storing vast amounts of data, and an I/O interface 308 for interfacing with peripheral devices (e.g., computer network, modem, etc.). More particularly, the memories (e.g., RAM 302, ROM 303, and data storage device 304) of server computer 300 store HTTP server software as well as the instruction codes in accordance with the present invention. A person of ordinary skill in the art will understand that the memories may also contain additional information such as applications programs, network communication programs (e.g., TCP/IP protocol), operating system software, data, etc.

Moreover, computer system 300 may include a display device 305 for displaying information to a computer user, an alphanumeric input device 306 (e.g., keyboard), and a cursor control device 307 (e.g., mouse, track-ball, light-pen, etc.) for communicating user input information and command selections.

In general, server computer system 300 coordinates on-line games between interested users/client-computers. Server computer system 300 also performs and manages the communication link quality measurements. The results of the quality measurements are compiled, by one or more designated servers known as matchmakers, such as server computer system 300, whose communications link quality meets the standard required for the particular game selected by the players. When such a game server is available, the matchmaker signals the server and the players that the game may begin.

Figure 4:
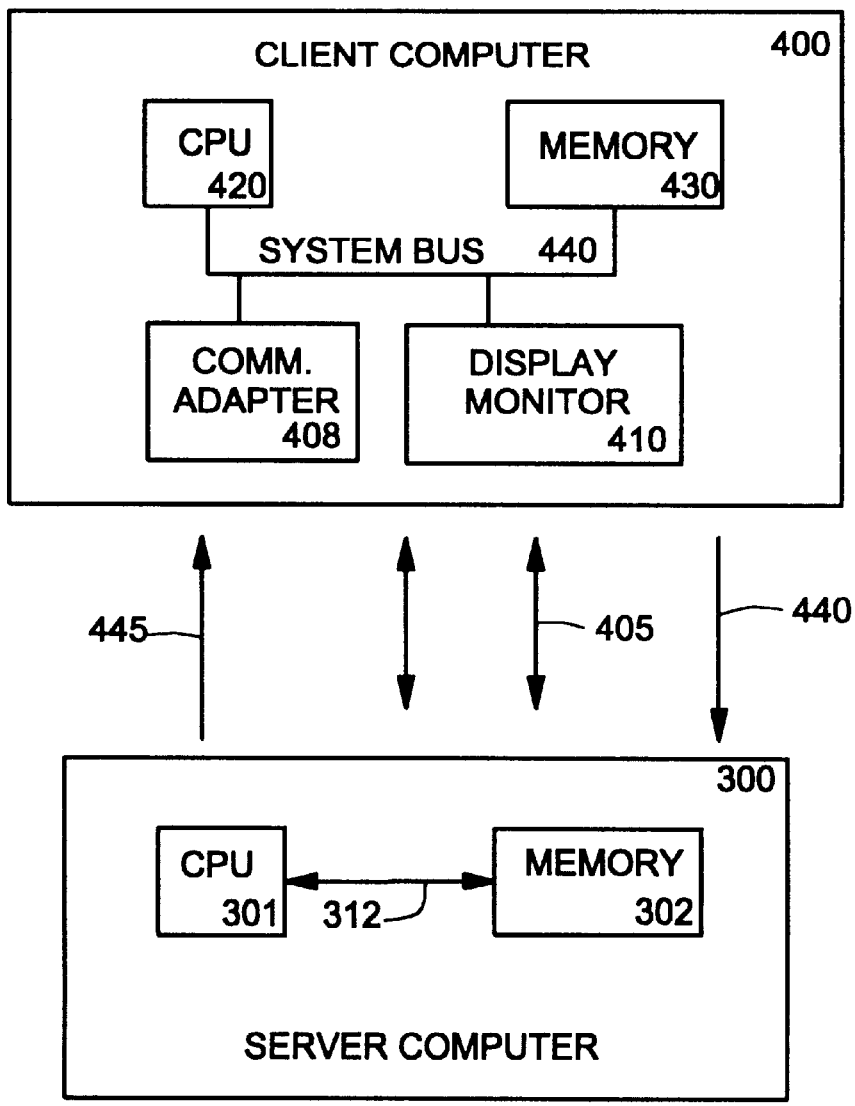
FIG. 4 illustrates a high level architectural view of a Web connection between a client computer and a server computer.

Reference is made to FIG. 4 illustrating a high level architectural view of a Web connection between a client computer and a server computer. In FIG. 4, client computer 400 consists of CPU 420, memory 430, display monitor 410, and communications adapter 408 which are connected together by system bus 440. Memory 430 stores browser software (e.g., NETSCAPE NAVIGATOR (TM), or MICROSOFT INTERNET EXPLORER (TM), etc.) to communicate to server computer 300 via network 405. It will be understood by a person of ordinary skill in the art that client computer 400 can also include other elements not shown in FIG. 4 such as disk drives, keyboard, etc. A person of ordinary skill in the art will understand that memory 430 may also contain additional information such as applications programs, network communication programs (e.g., TCP/IP protocol stack), operating system software, data, etc. Client computer 400 and server computer 300 are linked together by a network 405 in the fashion discussed earlier in FIGS. 1 and 2.

In an exemplary exchange, an end-user uses client computer 400 to execute the browser program stored in memory 430 to request, retrieve (via the network 405), and display images of documents (e.g., destination site Web pages). Each request by client computer 400 for retrieval of a document is formulated in accordance with the network protocol (e.g., HTTP) and transmitted across the network 405 to server computer 300. Server computer 300 receives HTTP requests such as request 440 and processes them using HTTP server software (which is well known in the art) stored in one of its memories (e.g., RAM 302, ROM 303, and data storage device 304). The HTTP server software of server computer 300 then instructs CPU 301 to retrieve HTML destination site page 445 from data stored in one of its memories (e.g., RAM 302, ROM 303, or, more typically, data storage device 304) and to transmit, typically using HTTP, a copy of destination site Web page 445 back to client computer 400 for display on monitor 410.

Generally, to log on to (ie. to become authenticated at) a destination site, a user is required to register in advance and provide personal information such as electronic mail (email) addresses, credit information, etc. Moreover, other information may be gathered from the user over time such as personal interests, demographic information, etc. All user information are then sorted and stored in a data base connected to the on-line computer servers (e.g., computer server 300). It is clear to a person of ordinary skill in the art that the data base and the associated data structure required for storing these information are well-known and commonplace.

In accordance to the present invention, destination site Web page 445 displays hypertextual advertising banners that upon being clicked-on by the end-user, results in the end-user s browser sending HTTP signal 440 with embedded codes identifying the advertised offerings (e.g., products, services, etc.) to a designated server computer similar to server computer 300 of FIG. 3. In response to the signal, CPU 301 of server computer 300 executes a software program stored in one of the memories (e.g., RAM 302, ROM 303, and data storage device 304). In general, the executed instructions use the user's identification (e.g., Internet Protocol (IP) address, registered credit information, etc.) to inspect the data base so as to locate information associated with the user which is typically stored in an extant data base. The executed instructions add, to the user data base, some codified data representing the new interest (e.g., the types of products, services, etc.), which was expressed by the user upon selecting the advertising banner. The executed instructions then monitor whether the user has finished the task for which that user logged on to the destination site. If the user has completed that particular task, the executed instructions then provide the user with information on the products/services requested. In other words, the current invention provides delayed information to users requesting them at a destination Web site without disrupting the user's current task.

Figure 5:
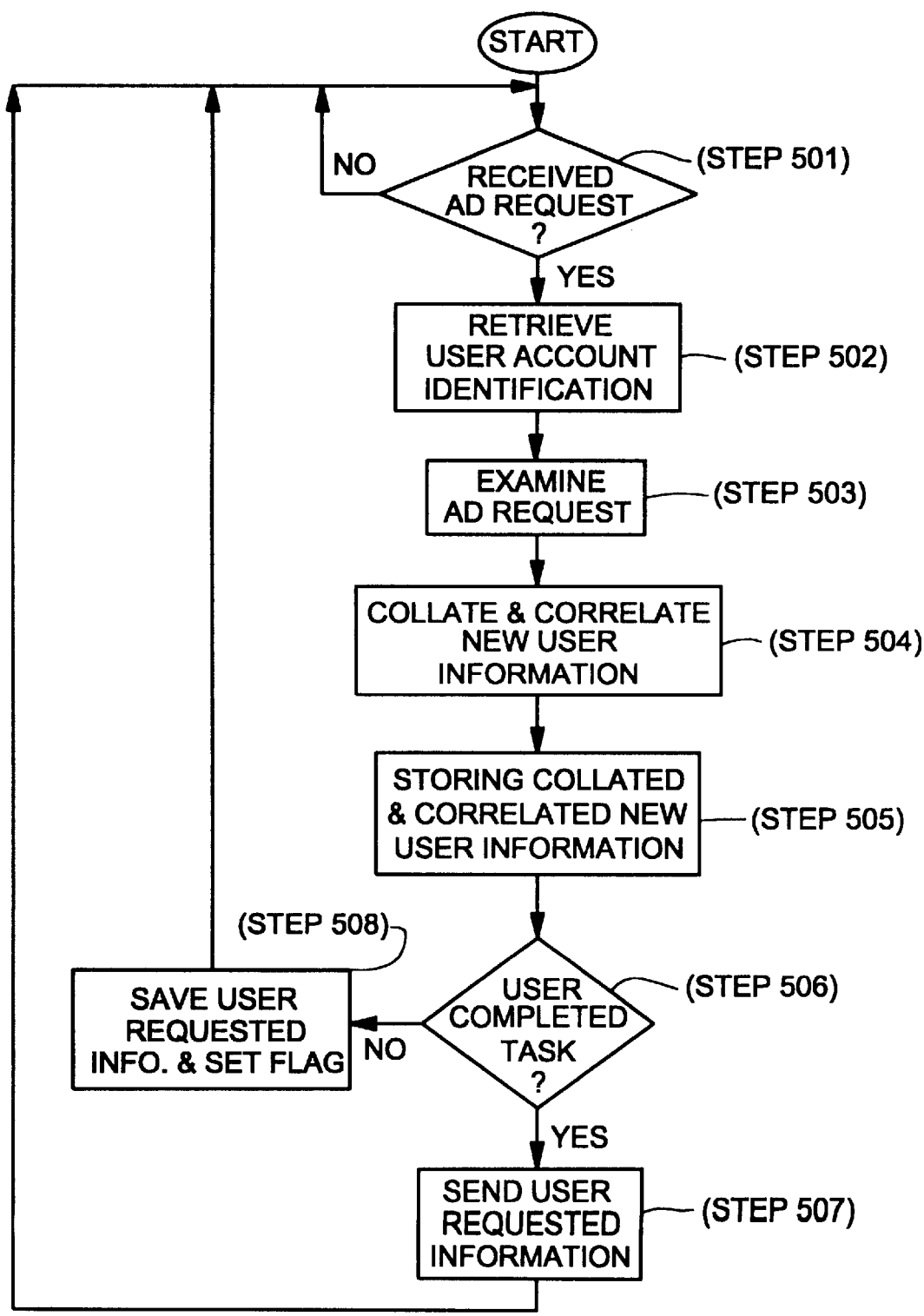
FIG. 5 is a flow chart illustrating the computer implemented steps to carry out an embodiment of the advertisement mechanism in accordance with the present invention.

Reference is now made to FIG. 5 illustrating the computer implemented steps to carry out an embodiment of the advertisement mechanism in accordance with the present invention. In general, the steps in FIG. 5 are designed to implement the mechanism discussed above. The steps in FIG. 5 are carried out when processor 301 executes the instruction codes stored in memory of server computer system 300. It is to be appreciated that the steps described (infra) are illustrative only and other sequences of steps could be used within the general scope of the invention.

In step 501, server computer system 300 monitors I/O communication interface 308 to determine whether an advertisement request has been received from a user. If no advertisement request has been received, server computer system 300 continues to monitor I/O communication interface 308. Otherwise, server computer system 300 determines the identification of the user making the request. This can easily be done because, as discussed earlier, only registered users can log onto a destination site. Being a registered user means that information including user identification are provided in advance to the on-line system administrator. Accordingly, when server computer system 300 receives an advertisement request, a trace to the user client computer can be performed to retrieve the user account log-on identification (step 502).

Next, in step 503, server computer 300 examines the advertisement request to extract relevant information such as related to products or services associated with the advertisement request. This information can be retrieved by methods such as reading the product/service code number embedded in the advertisement request signal. The information retrieved is then collated and correlated with respect to the previously recorded information pertaining to the user (step 504). In other words, using the fact that the user has expressed an interest in the product/service and recorded information, inferences can be drawn as to the probable interests the user might have. For example, by combining the inferred interests with any existing recorded interests in the data base, a more accurate sales lead as well as marketing information pertaining to the user can be generated. Additionally, demographic information can be generated based on the inferred interests and recorded interests. The increased accuracy in sales lead and marketing information as well as the demographic information are important advantages under the present invention. It should be clear that the inference engine to perform the collation and correlation is well-known to a person of ordinary skill in the art.

In step 505, the collated and correlated new user information are stored in the appropriate data structures set up for the user account. The data structures associated with destination sites for storing user information are well known to people of ordinary skill in the art. Next, server computer 300 monitors the connection with user client computer 400 or otherwise determines whether the user has completed the task (e.g., the video game) involving the use of services provided at the destination Web site (step 506). In short, server computer 300 examines the on-going control instructions and commands exchanged between user client computer 400 and server computer 300 to make determinations. Alternately, server computer 300 can also examine a designated flag set by user client computer 400 prior to starting the present task.

When the user has completed the task associated with the destination Web site, server computer 300 retrieves and sends the user the product, service or other offering information that the user has requested (step 507). Server computer 300 then goes back to step 501. Otherwise, server computer 300 stores the user requested information in its database and associated with the user account (step 508).

Additionally, server computer 300 sets a flag associated with the user account as a reminder to resend the user requested information later at a scheduled time. For example, server computer 300 can be programmed to check all the user accounts daily for such flag and to send out the user requested information when such flag is detected to be associated with the user account. Server computer 300 then goes back to step 501.

There are a number of well-known mechanisms that server computer 300 can implement in sending the user requested information. As an example, server computer 300 can utilize the user electronic mail (email) address associated with the account to electronically mail (email) the user with an attached electronic document or with an embedded hypertextual link. As another example, server computer 300 can implement push technology as made popular by POINT-CAST (TM) to send the requested information as well as any updated information to the user.

Although all of the steps above are desirable in the present embodiment, it is clear to a person of ordinary skill in the art that some steps may be omitted during implementation and still be within the scope of the invention.

Figure 6:
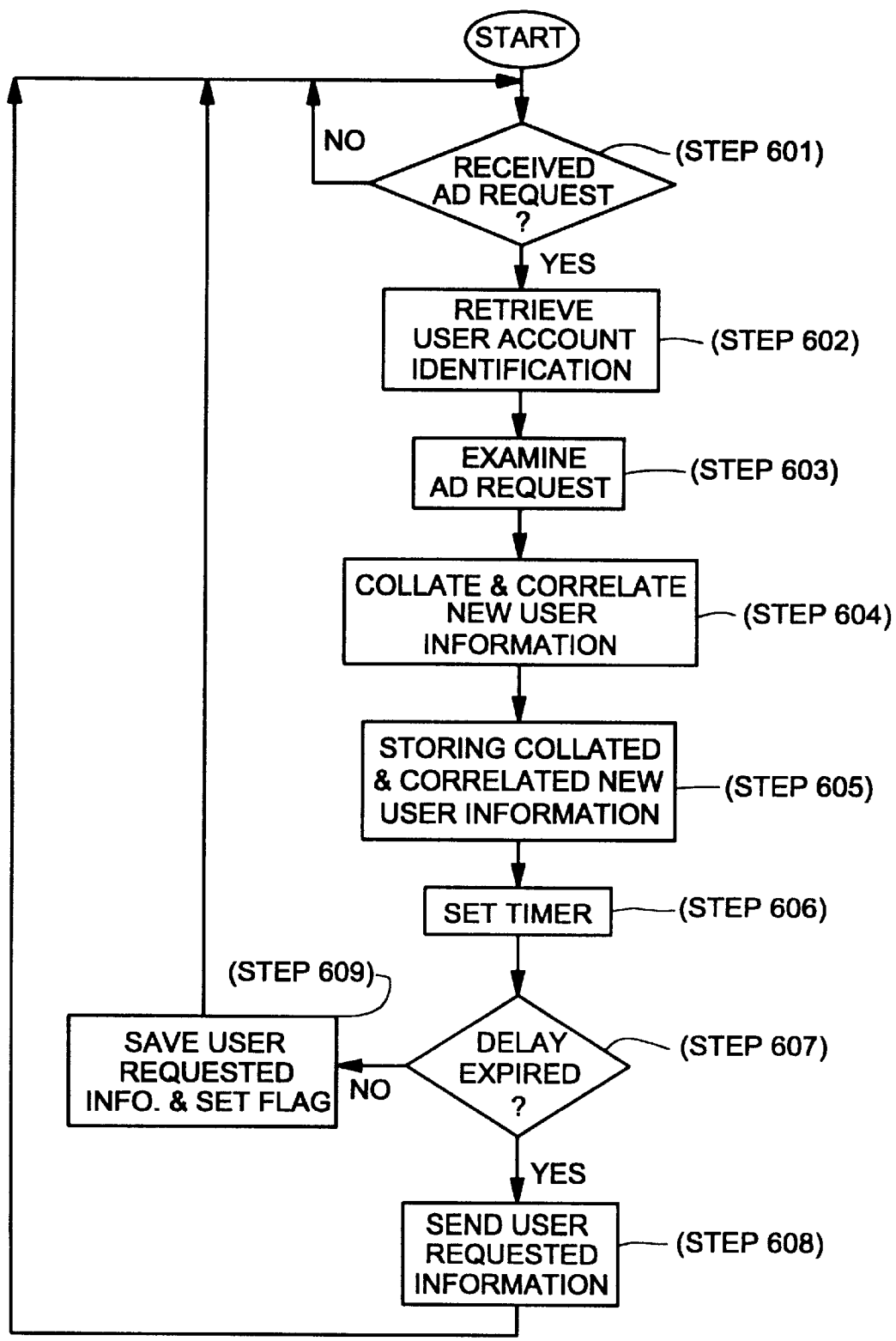
FIG. 6 is a flow chart illustrating the computer implemented steps to carry out an alternative embodiment of the advertisement mechanism in accordance with the present invention.

FIG. 6 illustrates the computer implemented steps to carry out an alternate embodiment of the present invention. It is to be appreciated that the steps described (infra) are illustrative only and other sequences of steps could be used within the general scope of the invention. In general, except for step 606, all the other computer implemented steps in FIG. 6 are identical to those in FIG. 5. The steps in FIG. 6 are carried out when processor 301 executes the instruction codes stored in memory of computer system 300.

In step 601, server computer system 300 monitors I/O communication interface 308 to determine whether an advertisement request has been received from a user. If no advertisement request has been received, server computer system 300 continues to monitor I/O communication interface 308. Otherwise, server computer system 300 determines the identification of the user making the request. This can easily be done because, as discussed earlier, only registered users can log onto a destination site. Being a registered user implies that information including user identification is provided in advance to the on-line system administration. Accordingly, when server computer system 300 receives an advertisement request, a trace to the user client computer can be performed to retrieve the user account log-on identification information (step 602).

Next, in step 603, server computer 300 examines the advertisement request to extract relevant information such as that related to products or services associated with the advertisement request. This information can be retrieved by reading the product/service code number embedded in the advertisement request signal. The information retrieved is then collated and correlated with respect to the recorded information pertaining to the user (step 604).

In step 605, the collated and correlated new user information are stored in the appropriate data structures set up for the user account. The data structures associated with destination sites for storing user information are well known to people of ordinary skill in the art. Next, in step 606, server computer 300 sets a timer. At the expiration of the timer, (step 607) server computer 300 retrieves and sends the user the product/service information that he has requested (step 608). Server computer 300 then goes back to step 601. Otherwise, server computer 300 stores the user requested information in the user account (step 609). Additionally, server computer 300 sets a flag associated with the user account as a reminder to resend the user requested information later at a scheduled time. For example, server computer 300 can be programmed to check all the user accounts daily for such flag and to send out the user requested information when such flag is detected in the user account. Server computer 300 then goes back to step 601.

Although all of the steps above are desirable in the present embodiment, it is clear to a person of ordinary skill in the art that some steps may be omitted during implementation and still be within the scope of the invention.

An improved advertisement banner for destination Web site is described supra. While the present invention has been described in particular embodiments, the present invention should not be construed as limited by such embodiments, but rather construed according to the below claims.

What is claimed is:

1. A method to make advertisement banners at destination sites in a client-server computer network supporting a uniform hypertextual protocol more attractive for client-users to explore, the method comprising the following steps:

receiving, by a server, a request for some information related to an advertisement banner on a destination site from a client; and in response to the request, the server monitors whether a user has finished a task for which the user logged on to a destination site and the server transmits the information related to an advertisement banner if the user has completed said task, wherein said transmission of said requested information does not interfere with a running application receiving other information over the internet.

2. The method of claim 1, wherein the server delays sending the requested information at least until the client completes a task that the client logs on to the destination site to perform.

3. The method of claim 2, wherein the server delays sending the requested information until a scheduled time.

4. The method of claim 1 further comprising the step of collating and correlating information inferred when the client makes the request for information.

5. The method of claim 4, further comprising the step of storing the collated and correlating information in a data base.

6. The method of claim 4, wherein the collating and correlating step involves generating demographic information.

7. The method of claim 4, wherein the collating and correlating step involves generating sales lead and marketing information.

8. The method of claim 1, wherein the server sends the requested information to the client by electronic mail.

9. The method of claim 1, wherein server sends the requested information to the client by push technology.

10. The method of claim 1, wherein the uniform hypertextual protocol comprises the hypertext transfer protocol (HTTP).

11. The method of claim 1, further comprising the step of creating, at the client, a personalized web page according to the requested information.

12. The method of claim 1, further comprising the step of creating, at the server, a personalized web page according to the requested information.

13. A server coupled to a client-server network supporting a uniform hypertextual protocol, the server comprising:

a system bus;

a processor connected to the bus;

memory connected to the bus; and a data communications device coupled between the bus and the communications network;

wherein the memory storing instruction codes, the instruction codes when executed by the processor performing the following steps: receiving a request for information related to an advertisement banner on a destination site from a client, and in response to the request, monitoring whether a user has finished a task for which the user logged on to a destination site and transmitting the information related to an advertisement banner if the user has completed said task, wherein said transmission of said requested information does not interfere with a running application receiving other information over the internet.

14. The server of claim 13, wherein the server delays sending the requested information at least until the client completes a task that the client logs on to the destination site to perform.

15. The server of claim 14, wherein the server delays sending the requested information until a scheduled time.

16. The server of claim 13 further comprising the step of collating and correlating information inferred when the client makes the request for information.

17. The server of claim 16, further comprising the step of storing the collated and correlating information in a data base.

18. The server of claim 16, wherein the collating and correlating step involves generating demographic information.

19. The server of claim 16, wherein the collating and correlating step involves generating sales lead and marketing information.

20. The server of claim 13, wherein the server sends the requested information to the client by electronic mail.

21. The server of claim 13, wherein server sends the requested information to the client by push technology.

22. The server of claim 13, wherein the uniform hypertextual protocol comprises the hypertext transfer protocol (HTTP).

* * * * *